United States Patent [19]

Reichenbach et al.

[11] Patent Number: 4,520,627
[45] Date of Patent: Jun. 4, 1985

[54] TURBOCHARGED INTERNAL COMBUSTION ENGINE

[75] Inventors: Dean H. Reichenbach; John H. Stang, both of Columbus; Lewis W. Cummings, New Whiteland; Richard E. Glasson; David A. Ruthmansdorfer, both of Columbus, all of Ind.

[73] Assignee: Cummins Engine Company, Inc., Columbus, Ind.

[21] Appl. No.: 521,625

[22] Filed: Aug. 9, 1983

[51] Int. Cl.$^3$ ............................................. F02F 1/42
[52] U.S. Cl. ................................. 60/599; 123/193 H
[58] Field of Search ............. 60/605, 599; 123/193 H, 123/563

[56] References Cited

U.S. PATENT DOCUMENTS

| 2,793,631 | 5/1957 | Schilling | 60/605 |
| 3,029,594 | 4/1962 | Miller | 60/605 |
| 4,258,550 | 3/1981 | Hinkle et al. | 60/599 |
| 4,269,158 | 5/1981 | Berti | 123/563 |
| 4,369,627 | 1/1983 | Kasting et al. | 60/605 |

Primary Examiner—Michael Koczo
Assistant Examiner—John J. McGlew, Jr.
Attorney, Agent, or Firm—Neuman, Williams, Anderson & Olson

[57] ABSTRACT

A turbocharged internal combustion engine is provided in which the exterior of one side of the engine block has a cavity formed therein. A head is secured to the block and overlies the cylinders formed therein. The head is provided with an internal intake passageway and an internal exhaust passageway for each cylinder formed in the block. One end of each intake passageway communicates with the cavity and one end of each exhaust passageway terminates at the exterior of the head in proximity to the cavity formed in the block. A heat exchange assembly is disposed adjacent the cavity and is provided with a housing which is mounted on the block one side and in overlying relation with the cavity. The housing is provided with an inlet and an outlet spaced therefrom. A heat transfer means is disposed within the housing and is located between the inlet and outlet thereof. The housing outlet communicates with the cavity. The housing inlet, on the other hand, communicates with the charged air outlet of a turbocharger which is located adjacent the one side of the block. The turbocharger is provided with an exhaust gas intake which communicates with the exhaust passageways formed in the head. The charged air entering the housing must pass the heat transfer means within the housing before exiting to the cavity.

7 Claims, 8 Drawing Figures 4,520,627

TURBOCHARGED INTERNAL COMBUSTION ENGINE

BACKGROUND OF THE INVENTION

Because of the limited space provided under the hood of a vehicle to accommodate the internal combustion engine therefor and the accessories associated therewith, it is important that such engine and the accessories be in as compact relation as possible. Heretofore, where the vehicle utilized a turbocharged engine, extreme difficulty was encountered in accommodating such an engine in the restricted space under the hood unless the configuration of the space was enlarged by increasing the height of the hood or placing the turbocharger or certain engine accessories outside the hood. To modify the configuration of the hood is an undesirable solution in many instances because of the cost involved and the esthetic appearance and the aerodynamics of the vehicle might be adversely affected. To place the turbocharger or certain of the accessories outside the hood is also an undesirable solution because they are exposed to adverse climatic conditions thereby requiring an inordinate amount of servicing and maintenance and are susceptible to vandalism and theft.

In many prior turbocharged engines a substantial amount of ductwork is required to route the charged air from the turbocharger to the aftercooler and then to cylinder head with the result that the charged air is subjected to pressure loss which adversely affects performance of the engine. The pressure loss is due in large measure to the friction generated by the numerous changes in direction the high velocity air undergoes as it flows through the ductwork.

SUMMARY OF THE INVENTION

Thus, it is an object of the invention to provide a turbocharged engine having an improved air induction system which avoids the aforenoted shortcomings associated with prior engines of this general type.

It is a further object to provide a turbocharged engine with an improved air induction system wherein bulky ductwork to and from the turbocharger has been eliminated, thereby enabling the engine to be readily accommodated with the normally restrictive space provided under the hood of the vehicle.

It is a still further object to provide a turbocharged engine having a compact air induction system which is of simple, sturdy construction and is highly efficient in operation.

Further and additional objects will appear from the description, accompanying drawings, and appended claims.

In accordance with one embodiment of the invention, an improved turbocharged internal combustion engine is provided wherein the exterior of one side of the engine block includes a cavity. Mounted on the block and in overlying relation with the cylinders formed therein is a head which is provided with an internal air intake passageway and an internal exhaust gas passageway for each cylinder. One end of each intake passageway communicates with the cavity and one end of each exhaust passageway terminates at the exterior of the head and in proximity to the cavity. Mounted on the block one side and overlying the cavity is a heat exchange assembly which is provided with a housing having an inlet and an outlet spaced therefrom and in communication with the cavity. Disposed within the housing and intermediate the inlet and outlet thereof is a heat transfer means. Disposed adjacent to the block one side is a turbocharger having an exhaust gas intake connected to the terminating ends of the exhaust passageways formed in the head. The charged air outlet of the turbocharger is connected to the housing inlet of the heat exchange assembly whereby the charged air flows past the heat transfer means before exiting into the cavity.

DESCRIPTION

For a more complete understanding of the invention, reference should be made to the drawings wherein.

Figure 1:
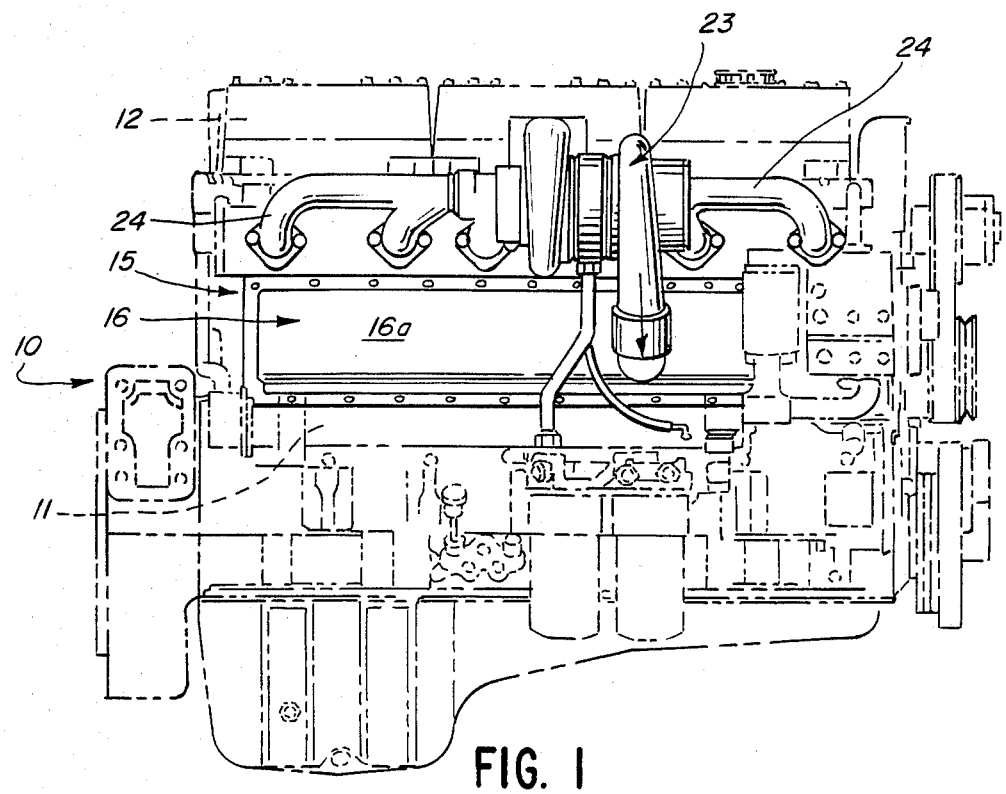
FIG. 1 is a fragmentary side elevational view of one form of the improved turbocharged engine, the latter being shown substantially in phantom lines, except for the turbocharger and air induction system therefor being shown in full lines.
Figure 2:
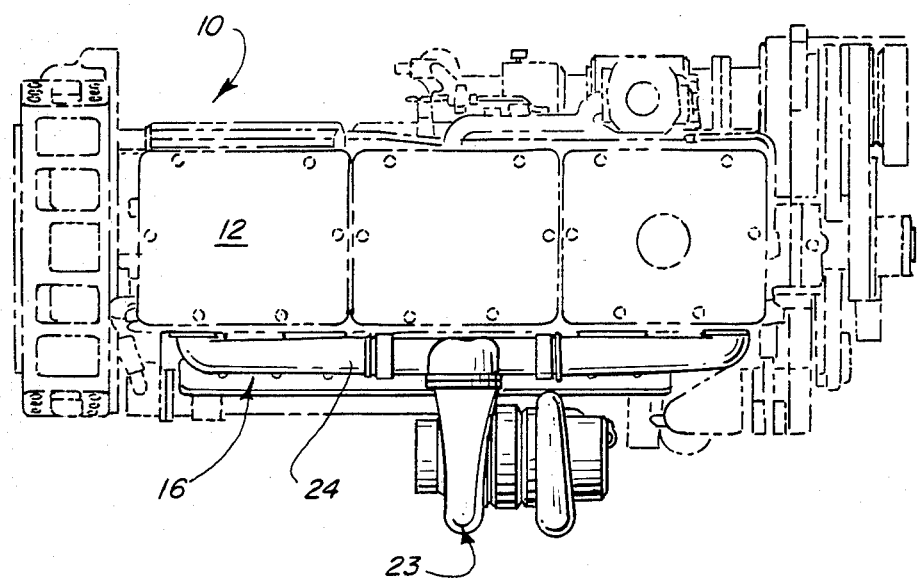
FIG. 2 is a top plan view of the engine of FIG. 1 with only the turbocharger and air induction system therefor shown in full lines.
Figure 3:
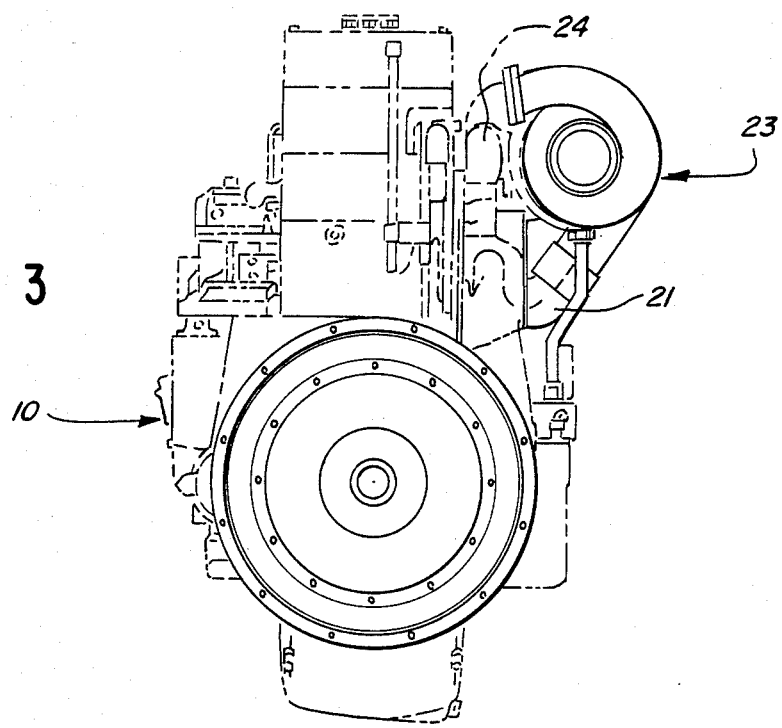
FIG. 3 is a left end view of the engine of FIG. 1 with only the turbocharger and air induction system therefor shown in full lines.

Referring now to the drawings and more particularly to FIGS. 1-3, a turbocharged in-line diesel engine 10 is shown which embodies an improved air induction system. Basically, engine 10 includes an engine block 11 in which are formed a plurality of cylinders C, see FIG. 4, which are arranged in spaced rows forming an in-line relation. Each cylinder C includes a bore B machined in the block with a liner L shrunk fit within the bore. A piston P is mounted for reciprocatory movement within the liner. Overlying the upper ends of the cylinders is a cylinder head 12, which is bolted or otherwise secured to the block.

Figure 4:
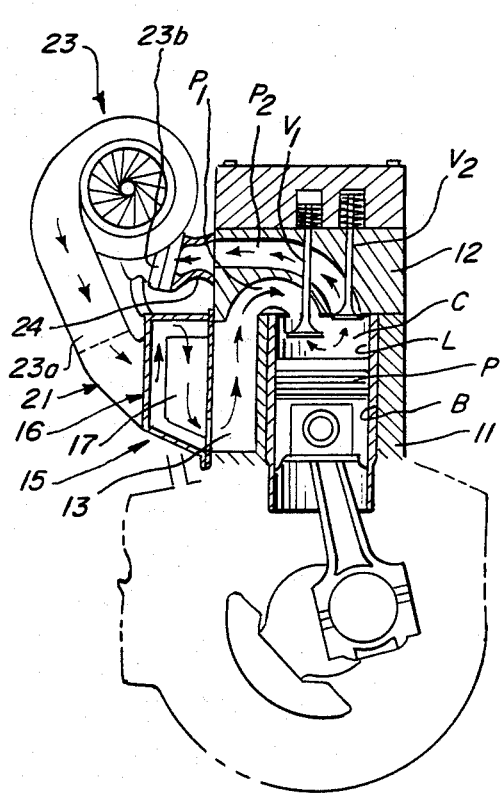
FIG. 4 is a fragmentary end view of the improved engine partially in vertical section and showing charged air flow to and exhaust gas flow from a cylinder formed in the engine block.

Mounted for reciprocatory movement within the head 12 are a plurality of valves $V_1$, $V_2$. Each cylinder is provided with at least one valve $V_1$, which controls the flow of the charged air into the combustion chamber formed in the upper end of the cylinder and at least one valve $V_2$, which works in a predetermined sequence with valve $V_1$ and controls the outflow of the exhaust gases from the combustion chamber. Valves may be in any of several arrangements including two or more per cylinder. The movement of the valves $V_1$, $V_2$ is controlled by a conventional rocker arm and cam arrangement, not shown. The head 12, as seen in FIG. 4 is provided with an internal intake passageway $P_1$ and an internal exhaust passageway $P_2$.

Figure 6:
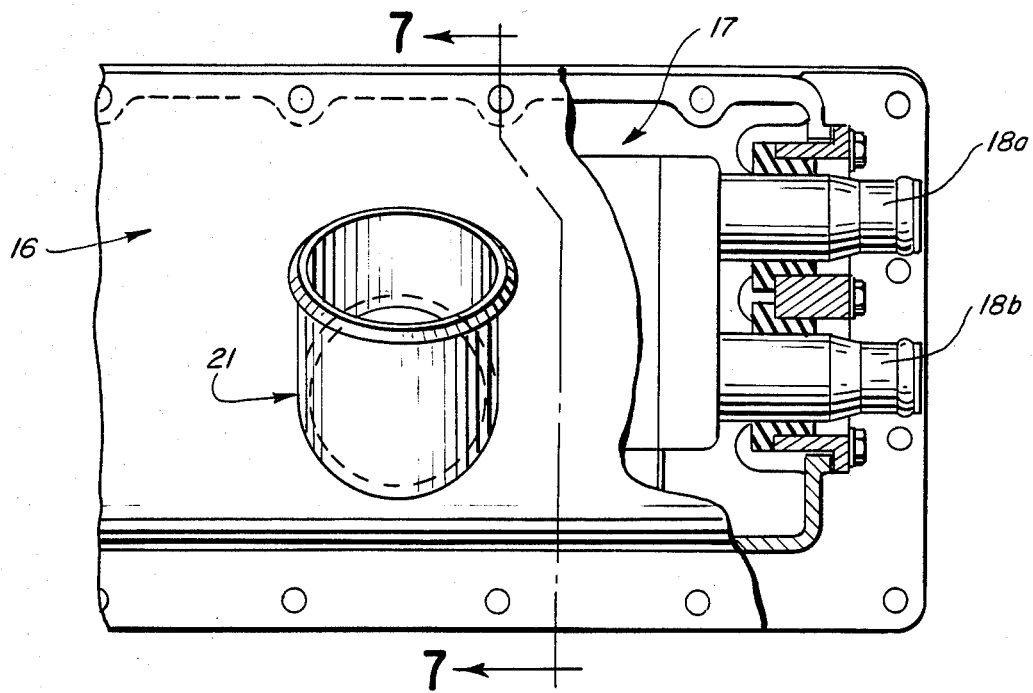
FIG. 6 is an enlarged fragmentary side elevational view of the heat exchange assembly embodied in the engine of FIG. 1; a portion of the assembly housing has been removed so as to expose one end of the heat transfer means enclosed therein.

One side of block 11 has the exterior thereof provided with an elongated cavity 13 which is segregated from the cylinder bores B formed in the block. One end of each intake passageway $P_1$ formed in head 12 communicates with an outlet formed in the upper portion of the cavity. Mounted on the block one side by suitable bolts 14 or the like is a heat exchange assembly 15, sometimes referred to as an aftercooler. In the illustrated embodiment, FIGS. 6-8, the heat exchange assembly 15 includes an elongated housing 16 and an elongated radiator 17 mounted therein. The radiator 17 may be of a type utilizing a liquid coolant (e.g. water) which enters and leaves the radiator through a pair of exposed ports 18a, 18b provided at one end, see FIG. 6. The ports are suitably connected to the discharge and suction sides of a pump, not shown. In addition to the radiator, the pump may effect circulation of the coolant throughout the engine.

The radiator 17 may comprise a plurality of interconnected passages through which the coolant circulates. The passages may be arranged in groups or sections which are spaced from one another so as to allow the charged air to flow therebetween as will be described more fully hereinafter. The direction of flow of the charged air past the radiator 17 is shown by arrows A in FIG. 8.

Suitable controls, not shown, may be utilized to regulate the coolant flow through the radiator. The radiator 17 is attached to a mounting plate 20 which over lies and closes off the open side of the cavity 13 except for an outlet port 20a formed therein which communicates with the cavity. The plate forms the concealed inboard side of the housing.

Figure 7:
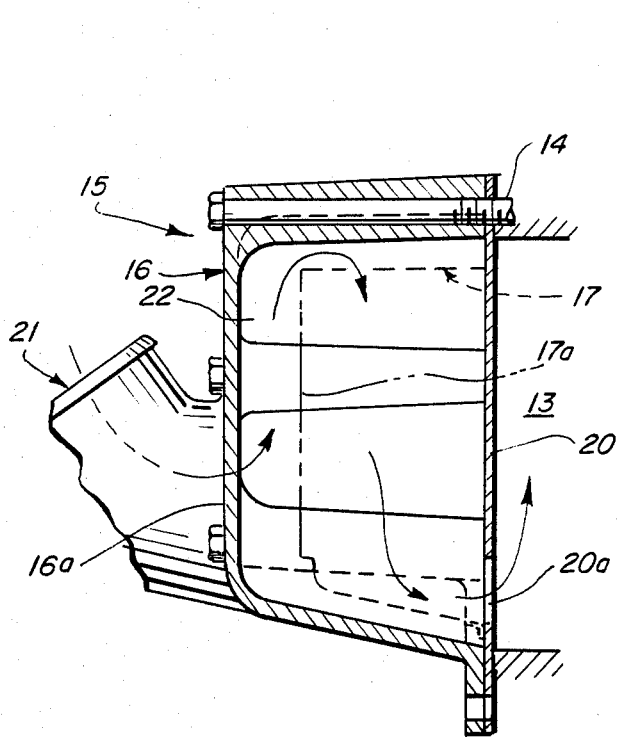
FIG. 7 is a sectional view taken along section line 7—7 of FIG. 6 but showing the outline of the heat transfer means in phantom lines.
Figure 8:
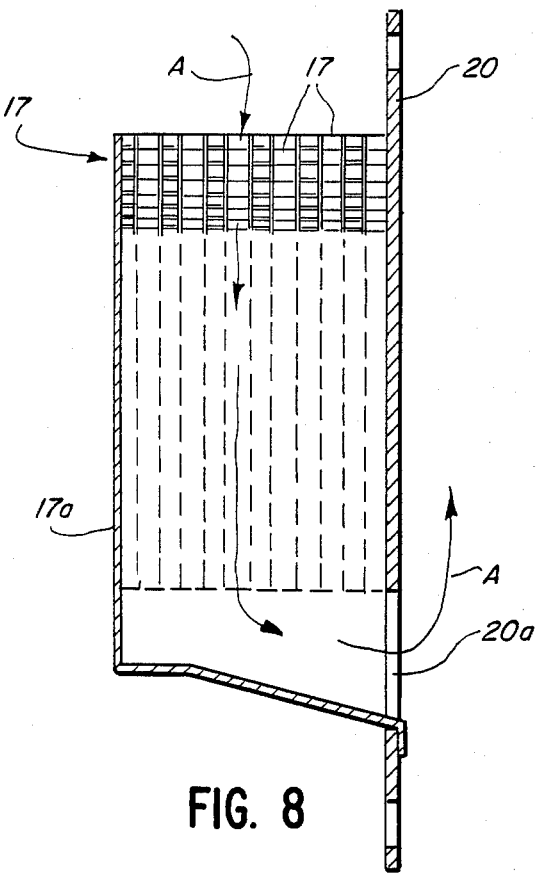
FIG. 8 is an enlarged fragmentary vertical sectional view of one form of a heat transfer means comprising a component of the heat exchange assembly.

The housing 16, as seen in FIG. 7, projects outwardly from the mounting plate 20 a sufficient amount so as to readily accommodate therein the relatively narrow elongated radiator 17, see FIG. 7. The outboard side of housing 16 is provided with a suitable inlet 21 which is spaced a substantial distance from outlet 20a. As shown by arrows A in FIG. 7 the charged air enters the interior of the housing through inlet 21 and then flows upwardly within a narrow space 22 formed between a vertically disposed baffle 17a comprising a part of the radiator 17, see FIG. 8, and the interior surface of an outboard wall 16a of the housing 16, see FIG. 7. At the upper end of space 22, the charged air changes direction and flows downwardly through flow-paths 17b formed in the radiator 17. At the lower ends of the flow-paths the charged air again changes direction and exits through outlet 20a into cavity 13.

Positioned adjacent to heat exchanger 15 is a conventional turbocharger 23 which has a charged air outlet 23a connected directly to the housing inlet 21. The turbocharger 23 is also provided with an exhaust gas inlet 23b. In the illustrated embodiment the inlet 23b is connected directly to an exhaust gas manifold 24 which is secured to the exterior of the head 12 and in close proximity to the aftercooler 15, see FIGS. 1, 2, and 4. Manifold 24 is of conventional design and is in communication with the discharge end of each exhaust gas passageway $P_2$ formed in the head 12. Because of the close proximity of the turbocharger 23 to the exhaust manifold 24 and the aftercooler 15 a minimum amount of ductwork is required, thereby rendering the turbocharger and air induction system a compact arrangement with respect to the engine. Furthermore, by reason of the minimal ductwork there is no significant pressure drop in the charged air flow which adversely affects the engine performance.

Figure 5:
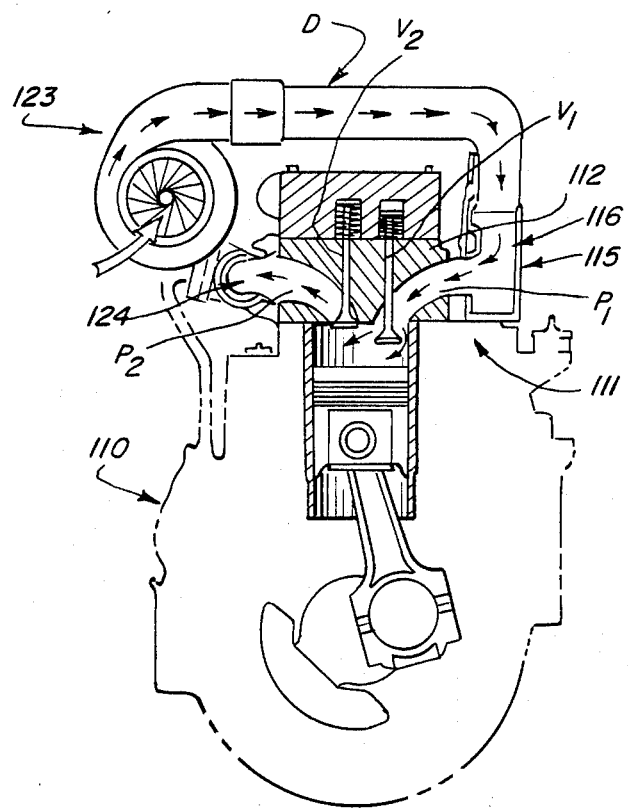
FIG. 5 is similar to FIG. 4 but showing the flow paths in a conventional turbocharged engine which is representative of the prior art.

The lack of compactness—that is to say, the bulkiness inherent in the air induction system commonly embodied in a prior art engine 110 is illustrated in FIG. 5. In engine 110 it is quite normal for the charged air to enter the combustion chamber of each cylinder from a suitable heat exchange unit 115 disposed to one side of the engine block 11 and for the exhaust gas to be directed to an exhaust manifold 124 located on the opposite side of the block. The relative location of the unit 115 and manifold 124 is dictated by the disposition of the internal passageways $P_1$ and $P_2$ formed in the head 112. As seen in FIG. 5, the charged air intake passageway $P_1$ has one end thereof terminating at the right side exterior of the head and the discharge passageway $P_2$ has one end thereof terminating at the left side exterior of the head. So as to most effectively utilize the pressure of the exhaust gases, the turbocharger 123 is located adjacent the left side exterior of the head. Because of the relative location of the turbocharger 123 with respect to the heat exchange unit 115, it is necessary to utilize an extensive amount of ductwork D which extends over the top of the engine 110 as noted in FIG. 5. Such an arrangement has two serious shortcomings: a) it necessitates heightening of the vehicle hood, and b) it results in a significant and undesirable pressure drop occuring in the flow of the charged air from the turbocharger 124 to the aftercooler 116. By rearranging the internal passageways $P_1$ and $P_2$ within the head 12 so that both passageways terminate at the same side of the engine and by having the block on such side of the engine provided with a cavity, the aforenoted problems are overcome.

Thus, a simple and effective solution to these problems has been obtained without costly and difficult modifications being required to the engine and its air induction system.

We claim:

1. A turbocharged internal combustion engine comprising a block provided with a plurality of cylinders and an elongated cavity formed on one side of said block and extending the length of said block and having an opening thereto on the exterior of said one side; a head mounted on said block in overlying relation with the corresponding end of each cylinder, said head being provided with an internal intake passageway and an internal exhaust passageway for each cylinder, one end of each intake passageway communicating with said cavity and one end of each exhaust passageway terminating at the exterior of said head adjacent said block one side and in proximity to said cavity opening; an elongated heat exchange assembly disposed adjacent said cavity opening and extending the length of said cavity and having a housing mounted on the exterior of said block one side in overlying relation with said cavity opening, said housing having an inlet and an outlet spaced therefrom, and a heat transfer means disposed within said housing intermediate said inlet and outlet and extending the length of said housing, said housing outlet extending the length of said cavity opening and communicating with said cavity opening; and a turbocharger disposed adjacent the exterior of said block one side and having an exhaust gas intake communicating with the terminating one end of each exhaust passageway of said head and a charged air outlet communicating with the housing inlet whereby the change air flow within said housing must pass said heat transfer means before exiting into said cavity; said turbocharger, said head exchange assembly, and the corresponding one ends of said exhaust gas passageways being in close proximity to said cavity.

2. The engine of claim 1 wherein the corresponding one ends of said exhaust passageways communicate with an exhaust manifold mounted on the exterior of said head adjacent said block one side and further adjacent said heat exchange assembly, said manifold having a discharge port connected to the exhaust gas intake of said turbocharger.

3. The engine of claim 1 wherein the communication of said cavity with the corresponding one ends of said internal intake passageways is spaced a substantial distance from the housing outlet to said cavity.

4. The engine of claim 1 wherein the cylinders of said block are arranged in a substantially in-line relation.

5. The engine of claim 1 wherein the heat transfer means of said assembly includes a liquid coolant circulating through an elongated radiator extending the length of said housing and disposed within said housing.

6. The engine of claim 5 wherein the charged air entering the housing is caused to flow past the radiator before exiting into said cavity.

7. The engine of claim 1 wherein said cavity is disposed on the bottom portion of said block one side and extends the length of said block.

* * * * *